(12) United States Patent
Giakas

(10) Patent No.: US 10,644,794 B2
(45) Date of Patent: May 5, 2020

(54) CONTACTLESS LOW-DISTANCE NETWORK-CONNECTION IN DATACENTERS

(71) Applicant: NEC Laboratories Europe GmbH, Heidelberg (DE)

(72) Inventor: Enrico Giakas, Sandhausen (DE)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 15/981,937

(22) Filed: May 17, 2018

(65) Prior Publication Data
US 2019/0356384 A1 Nov. 21, 2019

(51) Int. Cl.
*H04B 10/116* (2013.01)
*H04L 12/24* (2006.01)
*H04B 10/50* (2013.01)
*H04L 29/08* (2006.01)

(52) U.S. Cl.
CPC ........ *H04B 10/116* (2013.01); *H04B 10/502* (2013.01); *H04L 41/0803* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 2010/0161879 A1* | 6/2010 | Nation | G06F 12/0813 711/103 |
| 2013/0121701 A1* | 5/2013 | Morfino | H04B 10/1143 398/108 |
| 2016/0173199 A1* | 6/2016 | Gupta | H04B 10/11 398/127 |
| 2019/0044841 A1* | 2/2019 | Lairsey | H04L 45/02 |

OTHER PUBLICATIONS

"Welcome to the Li-Fi Consortium", Li-Fi Consortium™: next generation optical wireless communication technology, p. 1, Jun. 2015.
"Li-fi", Wikipedia, pp. 1-6, Dec. 20, 2017.

* cited by examiner

*Primary Examiner* — David W Lambert
(74) *Attorney, Agent, or Firm* — Leydig, Voit & Mayer, Ltd.

(57) ABSTRACT

A method for connecting nodes in a datacenter includes installing a first network node in a datacenter adjacent to at least a second network node. A wireless communication link is automatically established between the first network node and the second network node. A network is configured with the first network node, the second network node, and a third network node.

14 Claims, 5 Drawing Sheets ns/page.

CONTACTLESS LOW-DISTANCE NETWORK-CONNECTION IN DATACENTERS

FIELD

The present invention relates to a method for contactless point-to-point, close-range communication between components in a datacenter environment by using electromagnetic waves, such as optical-wireless-communication (OWC).

BACKGROUND

In computer datacenters, cabling components typically require structured cabling. Such cabling connections in datacenters require time-consuming cabling of components. Any changes in cabling structure may require additional time-consuming work.

Structured cabling requires additional space for cables and active networking components are required. Structured cabling requires work in addition to simply connecting components, such as tiding up, labeling, putting together, and configuring the cable connections. After the cabling is complete, there is limited flexibility to make physical changes to the datacenter. Additionally, over time as changes are made and written records are lost or inadequately maintained, cabling may become difficult to understand.

Cables may deteriorate over time as a result of oxidation or due to mechanical effects. Further, bad actors can potentially compromise the cable infrastructure. For example, cable infrastructure may be physically attacked using man-in-the-middle attacks.

The maximum fixed data-rate is limited by the technique and physical components used in the cabling structure. For example, common fixed speeds include 1 GB, 10 GB, and 40 GB-Ethernet or Fiber Channel. Additionally, physical cabling is expensive and the setup is slow and time consuming.

SUMMARY

One embodiment provides a method for connecting nodes in a datacenter. The method includes installing a first network node in a datacenter adjacent to at least a second network node. A wireless communication link is automatically established between the first network node and the second network node. A network is configured with the first network node, the second network node, and a third network node.

In another embodiment, a method for connecting nodes in a datacenter is provided. A first network node is removed in a datacenter adjacent to at least a second network node and a third network node. A wireless communication link is automatically severed between the first network node and the second network node. A wireless communication link between the first network node and the third network node is automatically severed. A wireless communication link is automatically established between the second network node and the third network node. A network is configured with the second network node, and the third network node.

Some embodiments of the invention include removing the first network node from the network and establishing, automatically, a wireless communication link between the second network node and the third network node. In some embodiments, the wireless communication link uses optical-wireless-communication (OWC). In some embodiments, the wireless communication link uses light fidelity (LiFi) communication. Likewise, in some embodiments, the wireless communication link uses free space laser communication. Additionally, in some embodiments, the first network node includes a first communication element at a defined position and the second network node includes a second communication element at a corresponding defined position and the first communication element and the second communication element are configured to establish the wireless communication link.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
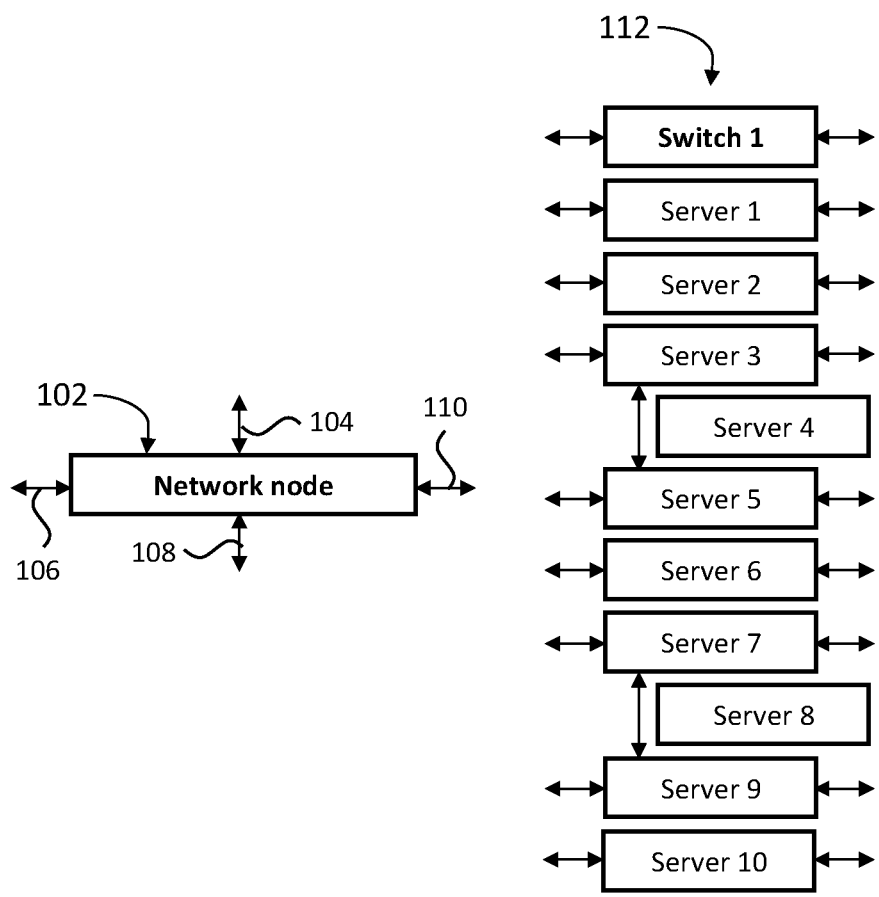
FIG. 1 illustrates a system including a single network node and inter-rack network connections according to an embodiment.

A problem unique to computer datacenters and solved by embodiments of the present invention is the complexity of physically connecting components in the datacenter. Structured cabling is time consuming to install and configure, is difficult to update and maintain, and may be subject to physical attacks. In contrast, embodiments of the described invention use wireless communication to connect datacenter components. For example, Optical-Wireless-Communication (OWC) may be used for close range communication between components in a datacenter environment. OWC systems use light to carry a signal. The light may be, for example, unguided visible, infrared (IR), or ultraviolet (UV) light. Light emitting diodes, lasers and other light emitters may be used as transmitters. Receivers include photodiodes, and photon-counting detectors, among other devices. Embodiments of the invention include cableless communication standards, such as OWC.

In some embodiments, in addition to OWC, other types of point-to-point electromagnetic waves may be used. Various connections in a datacenter can be wireless. For example, server-to-server, server-to-switch, switch-to-switch, server-to-rack and rack-to-rack connections can all be wireless. In some embodiments, by combining OWC with Software Defined Networking (SDN), a high flexible network matrix can be built and managed. SDN allows for network management and enables network configuration in order to improve network performance and monitoring. SDN allows dynamic, manageable, cost-effective, and adaptable, systems. SDN further supports high-bandwidth, dynamic applications. This architecture decouples the network control and forwarding functions. In certain embodiments, all nodes become part of the network infrastructure. Stability and network throughput can be increased by adding additional nodes to create a two- and three-dimensional network grid. In contrast to traditional cabling solutions, embodiments of the invention provide more efficient installation and maintenance, seamless updates and improved security.

In some embodiments, the invention provides systems and methods for connecting components in a datacenter. Embodiments can be used as an option in an existing network-infrastructure that also utilizes cabling. Additionally, embodiments can be used as the primary or only connections in a datacenter.

Datacenter components include, but are not limited to servers, switches, and racks. Other datacenter components include uninterruptible power supplies and even ceiling lights. According to some embodiments, each component can connect to a network, including a network backbone, wirelessly. A network backbone interconnects various network components (nodes) and may provide a network between various local area networks, wide area networks and subnets. Each component connecting wirelessly to the network may use up to six communication elements (receivers and transmitters) externally mounted to its case. The communication elements may be located on any surface of the component. For example, communication elements may be located on the two sides, upper surface, lower surface and the front back of a component. The particular communication elements used by the component may be dynamically set to the configuration needed. The communication elements may be mounted in a fixed and defined position (e.g. a distance of 5 cm from the front and 5 cm from the left side of a component).

FIG. 1 illustrates a system including a single network node and inter-rack network connections according to an embodiment. FIG. 1 includes a network node 102. Network node 102 can be any datacenter component including a switch, server or rack. Network node 102 includes communication elements 104, 106, 108 and 110. Each of the communication elements may be a receiver and a transmitter. In some embodiments, the network node 102 may be placed into a datacenter rack, such as rack 112. The illustrated rack 112 includes switch 1 and servers 1-10. Each of the components can communicate wirelessly with other components using the communication elements and, for example, Optical-Wireless-Communication (OWC).

Data-communication goes from one component to the next available component, even if there is a gap in between. For example, in rack 112, servers 1-10 are attached vertically. Additionally, components, such as node 102 may be attached horizontally to the system. For example, node 102 can be placed horizontally next to server 5. In this configuration, node 102 can communicate with server 5 through communication element 110 and the corresponding communication element on server 5.

If a new server is mounted in the rack 112, it will automatically connect to the nodes above and below as a new backbone node. The connections can utilize IEEE 802 protocols and networks including, for example, 802.1— Higher Layer LAN Protocols, 802.3—Ethernet, 802.15— Wireless PAN, and 802.15.7—Visible Light Communication. For example, if server 4 is inserted into the rack 112 between server 3 and server 5, server 4 will automatically connect to server 3 and server 5 as a new backbone node. When server 4 is not in rack 112, server 3 and server 5 communicate wirelessly using, for example, OWC. When server 4 is inserted, the direct connection between server 3 and 5 is disconnected. Likewise, if server 8 is inserted into the rack 112 between server 7 and server 9, server 8 will automatically connect to server 7 and server 9 as a new backbone node. The direct connection between server 7 and server 9 will automatically be severed. In this way, the network nodes may automatically manage connections, without human intervention.

Similarly, if a node, such as server 4 is removed from rack 112, a network link will be established between adjacent remaining nodes, such as server 3 and server 5.

If a Server is removed, link connection will be restored over the gap. For example, if server 8 is removed from the rack 112, server 7 and server 9 will automatically connect one another using their respective communication elements. Additionally, as a network-link to a network backbone or wider network, one or multiple network switches can be inserted into a rack. For example, in rack 112 switch 1 connects directly to server 1 and provides the rack a connection to a network backbone or wider network.

In some embodiments, network bandwidth in a datacenter depends on the number of interconnected nodes. In a two-dimensional grid of nodes, such as rack 112, there are up to 4 connections per component. For example, in rack 112, the top and bottom of each node is connected to an adjacent node. Additional nodes, such as node 102 can be connected to the side of any node, such as server 5. Additional racks of nodes can also be place in front of rack 112 and behind rack 112 to for a three-dimensional grid of nodes. In this way, the nodes can also be connected to adjacent nodes in front of and behind them. For example, server 5 can be connected to server 4 and server 6 as well as nodes, such as node 102, on each side and in front of and behind server 5. Thus, a two-dimensional grid, up to 4 connections can be made. In a three-dimensional grid, up to 6 connections can be made.

One standard that can be used for the Optical-Wireless-Communication (OWC) is Light Fidelity (LiFi). LiFi uses light to wirelessly transmit data between devices. Light emitting diodes (LEDs) may be used to transmit the light. Additional standards, such as Free Space Laser Communication and Infrared Data Association (IrDA) protocols can also be used. In some embodiments, radio transmissions can be used instead of OWC. Embodiments may use any appropriate electromagnetic wave technology. The current maximum bandwidth of LiFi is 224 Gbit/s. Therefore, using LiFi, a node can have theoretically up to 1,344 Tbit/s total network throughput. This bandwidth allows for backup, archive, and database systems.

Embodiments include various types of components and connections such as server-to-switch, server-to-rack and rack-to-rack communication. Additionally, existing devices and components can be upgraded and integrated into wireless environments by mounting the communication-elements on the component.

Figure 2:
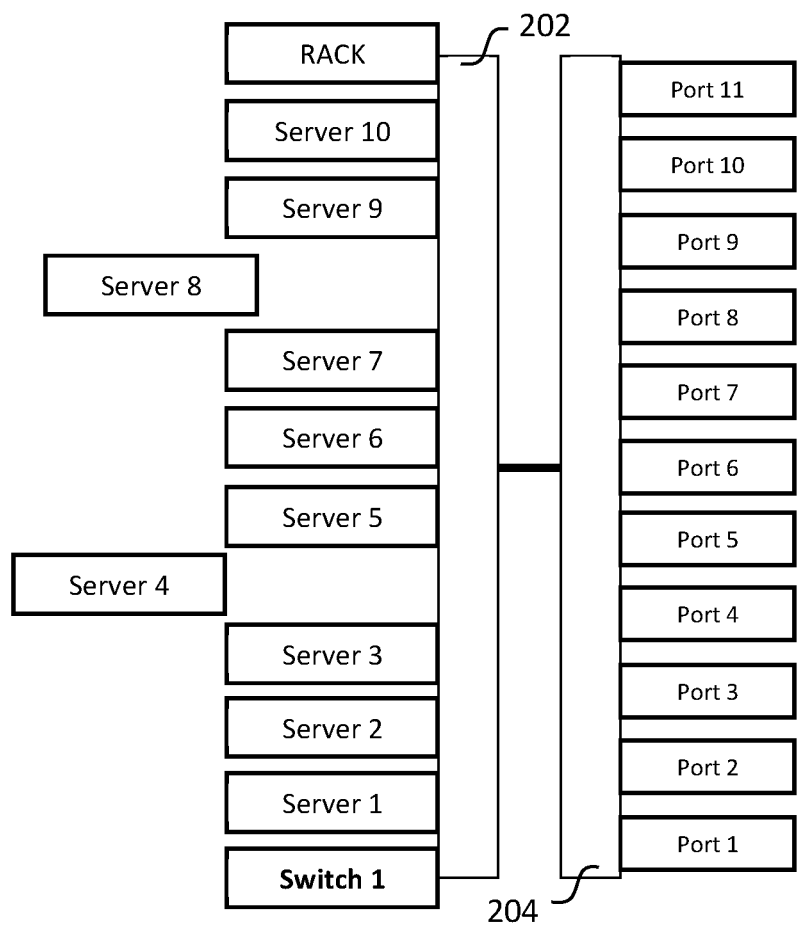
FIG. 2 illustrates a logical network including multiple nodes, a virtual data backplane and a software defined switch according to an embodiment.

FIG. 2 illustrates a logical network including multiple nodes, a virtual data backplane and a software defined switch according to an embodiment. Similarly, to FIG. 1, nodes, such as server 4 and server 8, can be inserted or removed from a rack. A software defined networking switch 204 manages the data-flow. A software defined network (virtual switch) is a software application that allows communication between components, such as virtual machines. A virtual switch may intelligently direct the communication on a network by checking data packets before moving them to a destination. The various nodes, such as switch 1, servers 1-10 and the rack, form a virtual data backplane 202. A virtual data backplane may allow for management of multiple physical network elements. The software defined networking switch 204 logically connects nodes together within the virtual data backplane 202. In this way, nodes can be dynamically added and removed from the network.

Optical-Wireless-Communication (OWC) technology is continually obtaining faster data rates. For example, the LiFi technology currently supports data rates up to 224 Gbit/s. As data-rate speeds continue to increase, embodiments of the invention are able to take advantage of the higher speeds.

Figure 3:
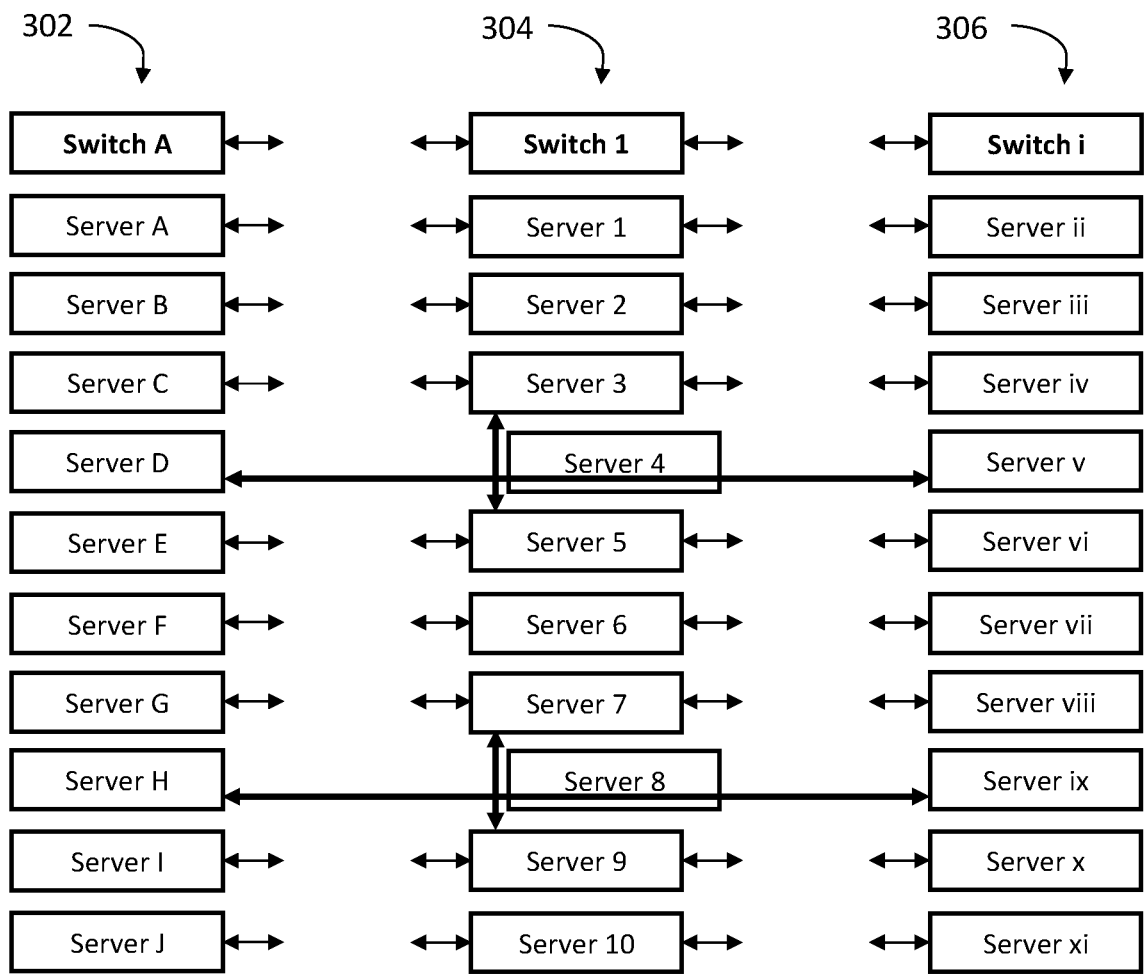
FIG. 3 illustrates a two-dimensional grid of network nodes according to an embodiment.

FIG. 3 illustrates a two-dimensional grid of network nodes according to an embodiment. Rack 302 includes switch A and servers A-J. Rack 304 includes switch 1 and servers 1-10. Rack 306 includes switch i and servers ii-xi. Adding additional nodes to a network grid improves the stability and the network-throughput for single nodes. Within each rack, components may communicate with adjacent components. For example, server 1 communicates with switch 1, and server 2. Additionally, server 1 may communicate with components in adjacent racks, such as server A and server ii.

In the case of a grid-structure a node has up to 4 neighbors so that traffic can be rerouted through the healthy nodes if one component fails. For example, server 1 can directly communicate with server A, switch 1, server 2, and server ii. If one of the nodes it is connected to fails, server 1 can then reroute traffic through the remaining nodes it is connected to. Possible failures include communication element failures and node failures. The grid can be extended to three-dimensional structures by placing the communication elements at the front and backside of a node, such as server 1. Similarly, if server 8 is removed, servers 7 and 9 establish a communication link and server H and server ix establish a communication link.

If server 4 is reinserted into rack 304, it establishes communication links with server 3, server 5, server D and server v. Likewise, if server 8 is inserted into rack 304, it establishes communication links with server 7, server 9, server H and server ix.

In the illustrated embodiment, when server 4 is removed from rack 304, server 3 begins to communicate directly with server 5. Similarly, server 4 had been communicating with server v and server D. When server 4 is removed server D and server v establish a OWC link.

Figure 4:
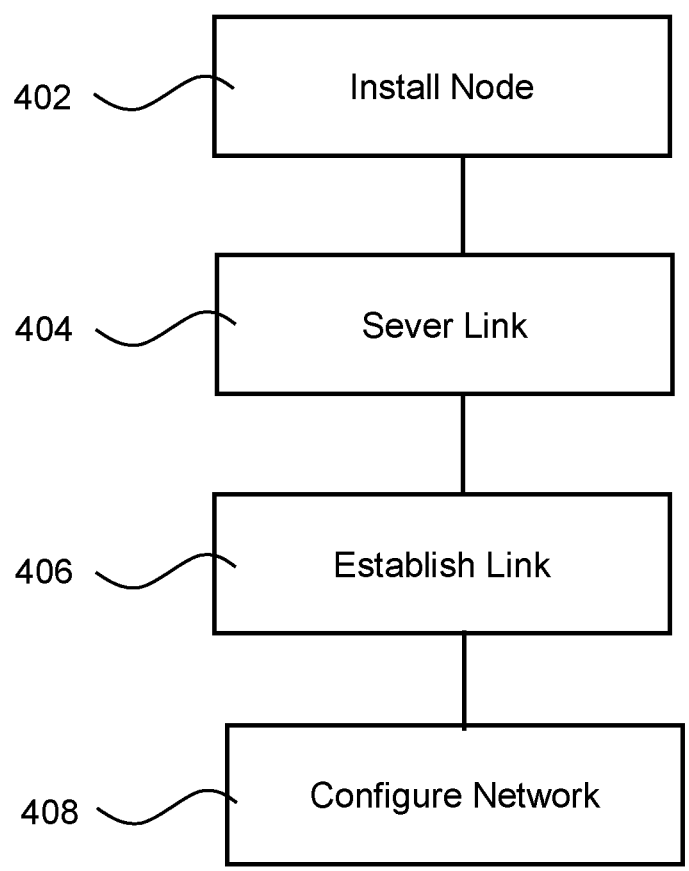
FIG. 4 illustrates a process for connecting nodes in a datacenter according to an embodiment.

FIG. 4 illustrates a process for connecting nodes in a datacenter according to an embodiment. At step 402, a first network node is installed in a datacenter adjacent to at least two adjacent network nodes, such as a second network node and a third network node. In some embodiments, a first network node is installed in a datacenter adjacent to at least one adjacent network node. For example, when the first network node is at the end (top or bottom) of a network rack. At step 404, a communication link between previously installed network nodes is severed. For example, in one embodiment, network node 2 is communicating with network node 3. Network node is inserted in between and adjacent to, network nodes 2 and 3. The previously established network link between network nodes 2 and 3 is severed.

At step 406, a wireless communication link between the first network node and the adjacent network nodes is established. For example, at step 406 a wireless communication link between the first network node and the second network node is established. A wireless communication link between the first network node and the third network node is also established. In some embodiments, the link is an OWC connection. At step 408 a network is configured with the first network node and the adjacent network nodes using software defined networking (SDN). For example, a network is configured with the first network node, the second network node, and the third network node. If the first network node is removed from the network, a communication link between the second network node and the third network node is established and a network is configured between the second network node and the third network node.

Figure 5:
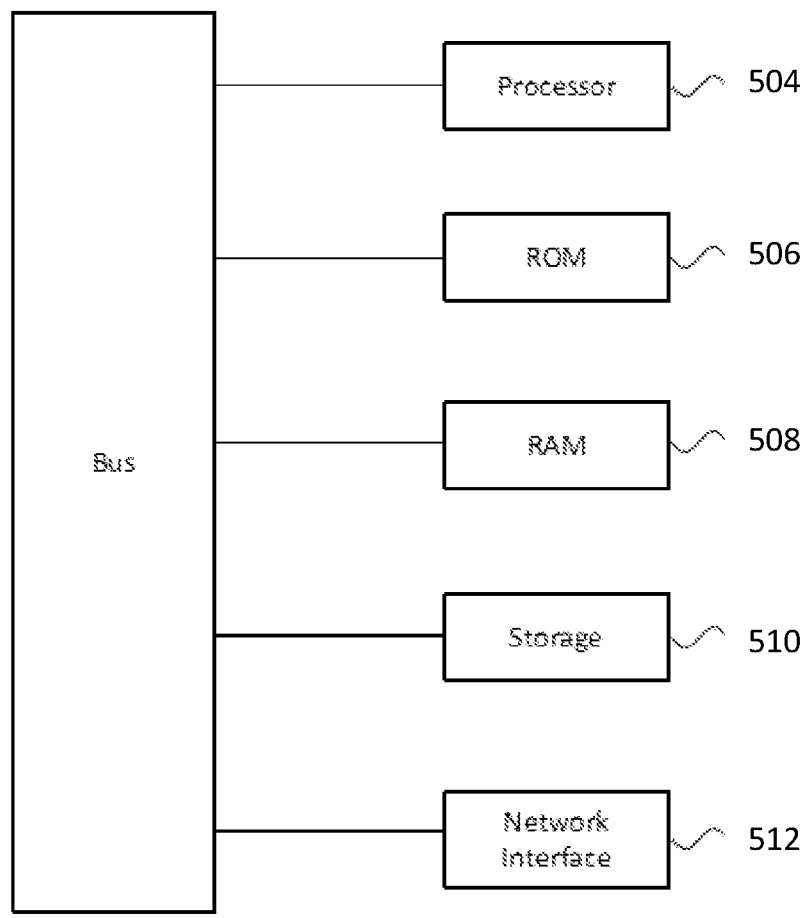
FIG. 5 is a block diagram of a network node according to an embodiment.

FIG. 5 is a block diagram of a node according to one embodiment. The node can be used to implement the computing systems, servers, switches, racks, and processes described above. The processing system includes a processor 504, such as a central processing unit (CPU), executes computer executable instructions comprising embodiments of the system for performing the functions and methods described above. In embodiments, the computer executable instructions are locally stored and accessed from a non-transitory computer readable medium, such as storage 510, which may be a hard drive or flash drive. Read Only Memory (ROM) 506 includes computer executable instructions for initializing the processor 504, while the random-access memory (RAM) 508 is the main memory for loading and processing instructions executed by the processor 504. The network interface 512 may connect to a wired network or cellular network and to a local area network or wide area network, such as the internet. Further, the network interface 512 may include a transmitter and a receiver to implement Optical-Wireless-Communication links as described above.

All references, including publications, patent applications, and patents, cited herein are hereby incorporated by reference to the same extent as if each reference were individually and specifically indicated to be incorporated by reference and were set forth in its entirety herein.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for connecting nodes in a datacenter, the method comprising:
    installing a first network node in a datacenter, a second network node in the datacenter adjacent to the first network node, and a third network node in the datacenter adjacent to the second network node;

establishing, automatically, a wireless communication link between the first network node, the second network node, and the third network node; and configuring a network with the first network node, the second network node, and the third network node;

removing the second network node from the network; and establishing, automatically and after removing the second network node from the network, a wireless communication link between the first network node and the third network node.

2. The method according to claim 1, wherein at least one wireless communication link uses optical-wireless-communication (OWC).

3. The method according to claim 1, wherein at least one wireless communication link uses light fidelity (LiFi) communication.

4. The method according to claim 1, wherein at least one wireless communication link uses free space laser communication.

5. The method according to claim 1, wherein at least one wireless communication link uses Infrared Data Association (IrDA) communication.

6. The method according to claim 1, wherein the first network node includes a first communication element at a defined position and the second network node includes a second communication element at a corresponding defined position and the first communication element and the second communication element are configured to establish a wireless communication link.

7. The method according to claim 1, wherein a communication element for the first network node is a distance of 5 cm from a front and 5 cm from a left side of the first network node.

8. The method according to claim 1, further comprising establishing wireless communication links between the first network node and a plurality of adjacent network nodes.

9. The method according to claim 1, further comprising forming a virtual backplane between the first network node and the third network node.

10. The method according to claim 1, wherein the first network node is a server.

11. The method according to claim 1, wherein the first network node is a switch.

12. A method for connecting nodes in a datacenter, the method comprising:

removing a first network node in a datacenter adjacent to at least a second network node and a third network node;

severing, automatically, a wireless communication link between the first network node and the second network node;

severing, automatically, a wireless communication link between the first network node and the third network node;

establishing, automatically and after removing the first network node from the network, a wireless communication link between the second network node and the third network node; and configuring a network with the second network node, and the third network node.

13. The method according to claim 12, wherein at least one wireless communication link uses optical-wireless-communication (OWC).

14. The method according to claim 12, wherein the first network node includes a communication element at a defined position.

* * * * *